Sept. 4, 1956

K. G. HEPLER 2,761,304

VALVE INTERLOCK

Filed Dec. 31, 1952

INVENTOR.
KENNETH G. HEPLER

BY *Ostrolenk & Faber*

ATTORNEYS

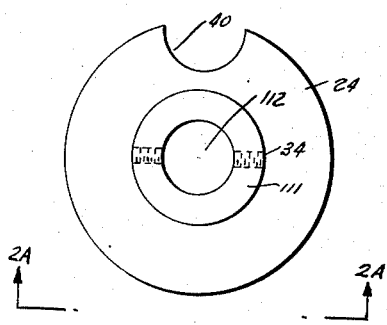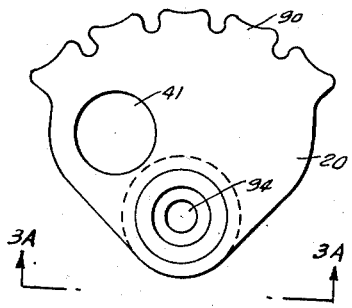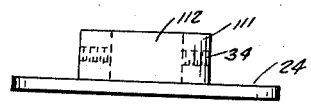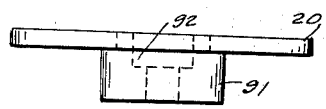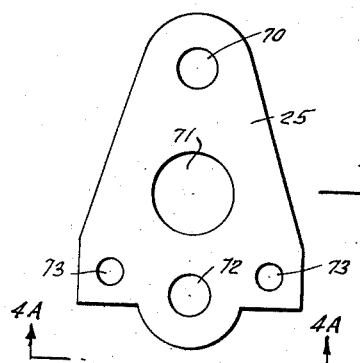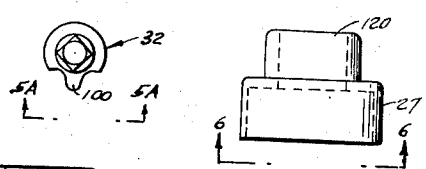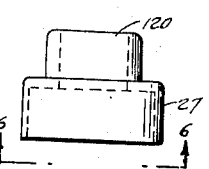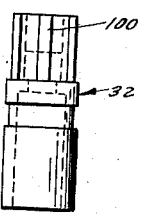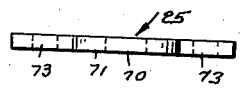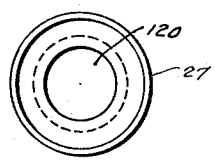

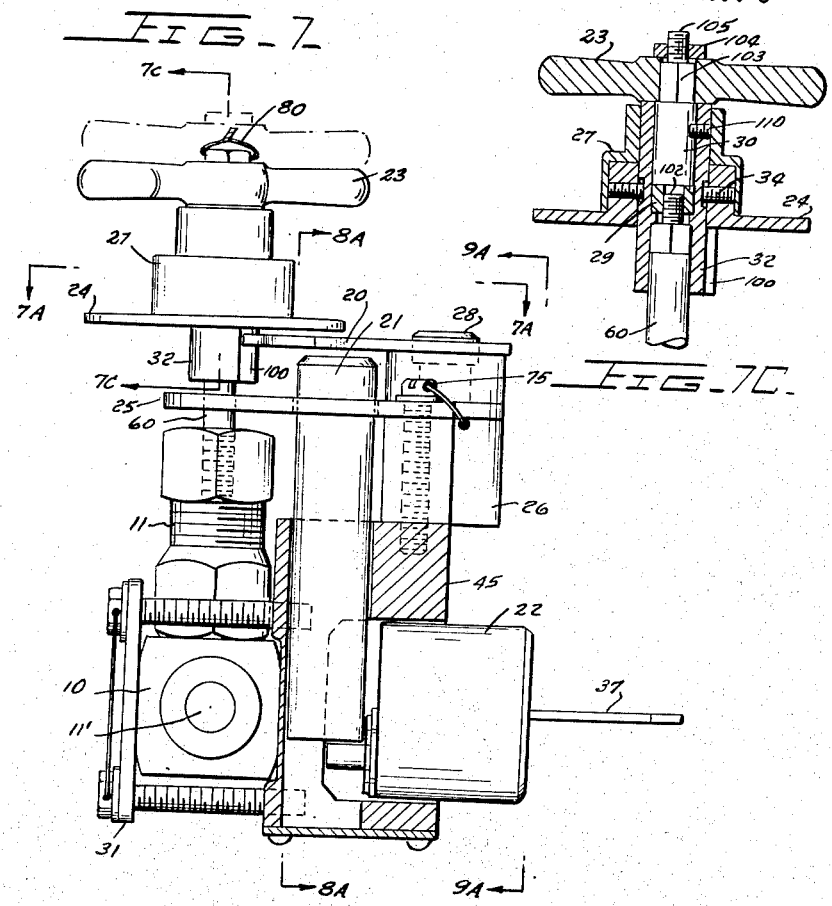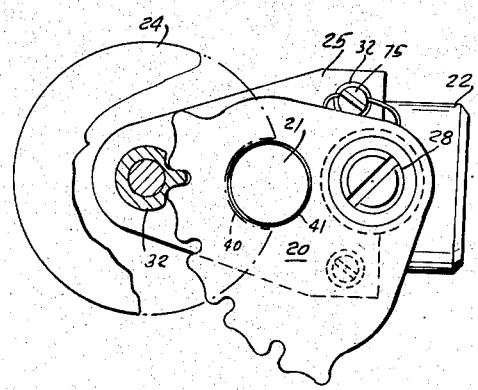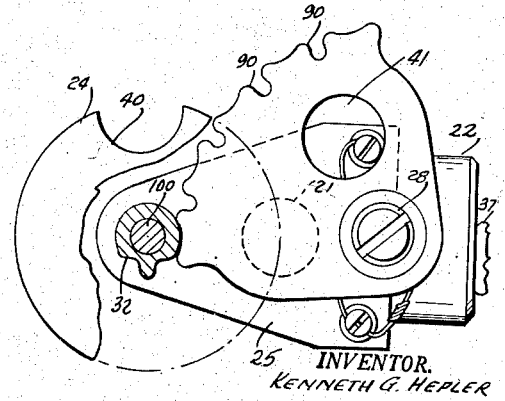
INVENTOR.
KENNETH G. HEPLER
BY
ATTORNEYS

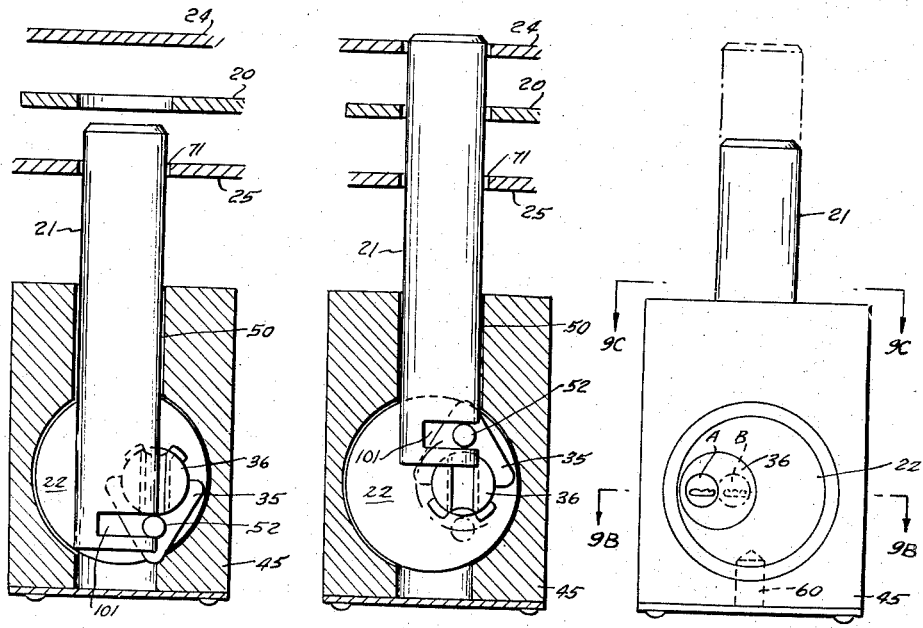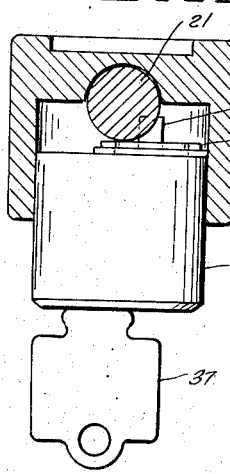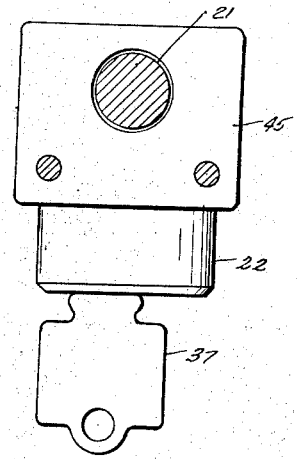

United States Patent Office 2,761,304
Patented Sept. 4, 1956

2,761,304

VALVE INTERLOCK

Kenneth G. Hepler, Greensburg, Pa., assignor to I-T-E Circuit Breaker Company, Philadelphia, Pa., a corporation of Pennsylvania Application December 31, 1952, Serial No. 328,900

9 Claims. (Cl. 70—177)

My invention relates to valve interlocks, and more particularly it is directed to a novel apparatus which will insure the maintaining of a multiple revolution stem valve in any predetermined position until authorized personnel approve the opening of same.

My novel interlock can be applied to any multi-revolution device, such as a valve, to lock same in an opened, closed, or intermediate position.

In industrial applications where large quantities of fluids are to be transferred from one vat or storage area to another it is necessary to maintain traffic control of the fluid by means of a plurality of valves controlling the input and output of same.

In a complex network it is frequently necessary to preset five or six valves in order to properly govern or control the fluid path into and out of a plurality of stages. In this type of operation it is necessary to maintain the valve of the original storage tank in a predetermined position until all of the remaining valves which will govern the traffic flow of the fluid are properly positioned.

For example, in the event the main control valve, governing the flow of fluid out of the original storage tank, is opened prior to the time the remaining valves are set in their predetermined position it is possible that the fluid may be caused to flow into improper channels. Thus, improper coordination of the valves by the personnel responsible for same may result in having the valuable processed fluid flow into a drainage outlet or improper channels, thereby resulting in undesirable mixing or operation.

With my novel device the main control valve can be locked in a predetermined position by authorized personnel with insurance that the valve will be maintained in this predetermined position until the remaining co-ordinated valves of the system are properly positioned.

The novel interlock device of my invention permits a foreman or authorized personnel to remove a key from the control valve so that it cannot be moved to a second position until he has approved and is sure that the remaining coordinated valves are in their proper position.

My novel interlock device comprises a Geneva type gear arrangement, a lock bolt, a geared locking disc, a locking disc supporting plate. The handle and stem controlling the opening and closing of the valve has a single tooth gear concentric therewith and keyed thereto.

A geared locking disc is positioned and controlled through the single tooth gear when the handle and stem of the valve are rotated. The geared locking disc is provided with an opening which registers with a companion opening of the locking disc which is concentric with the stem. The lock bolt is positioned by means of a cam arrangement controlled by a key and its associated plug. When the valve and stem are moved to a first position the opening in the geared locking disc is not in register with the opening in the supporting plate and locking disc and hence movement of the lock bolt by the plug and cam is defeated by the geared locking disc.

For example, this position may represent the valve fully or partially opened with upward movement of the lock bolt defeated. In this position it is impossible to remove the key from the lock cylinder. When the handle and stem move the valve to the second position the openings in the locking disc and the geared locking disc are in register with the lock bolt. In this position the plug and cam can move the lock bolt through the register openings in the locking disc and geared locking disc to thereby defeat any movement of the handle and stem.

In this position the key can be removed from the cylinder by authorized personnel to insure that the valve will be maintained in this second position, for example closed.

After the remaining valves or other conditions in the system are properly set and the foreman or authorized personnel has approved the settings, the key can be re-inserted in the cylinder and operated to move the lock bolt out of engagement with the registered opening in the locking disc and geared locking disc.

The handle and stem are now free to be moved to the valve first position which, as heretofore noted, will defeat vertical movement of the lock bolt and prevent unauthorized personnel from removing the key from the lock cylinder.

By providing a Geneva type gear arrangement between the valve stem and the geared locking disc so that a 360° rotation of the stem causes periodic movement of the latter unit I am able to provide a novel interlock device of a multiple revolution device.

Furthermore, by providing a novel arrangement wherein only the openings of the geared locking disc and the locking disc need be in register in order to lock the valve in a predetermined position it is possible to rapidly and easily make adjustments for wear in the valve. That is, after continued use of the valve if the seating position thereof should be changed due to undue wear it is possible to reposition the locking disc with respect to the valve stem so that the opening thereof may still register with the opening in the geared locking disc when the valve is in any desired predetermined position.

Accordingly, the primary object of my invention is to provide a novel valve interlock device which is rapidly and easily adapted for a multiple revolution device.

Another object of my invention is to provide a novel valve arrangement which can be locked and maintained in a predetermined position until authorized personnel approve a change in the position of the valve.

Still another object of my invention is to provide an interlock device which will insure that the key and lock arrangement will be prevented from locking the valve in a position other than a predetermined position.

Another object of my invention is to provide a novel device in which the key can be removed from its associated plug only when the valve has been moved to its predetermined position.

A still further object of my invention is to provide a Geneva type gear arrangement for a fluid valve interlock device which will defeat the locking apparatus when the valve is not in a predetermined position.

A further object of my invention is to provide an interlock device which is readily adaptable to various types of valves irrespective of the number of revolutions required to open and close same.

A still further object of my invention is to provide an interlock device which has relatively few parts and is economical to manufacture.

Another object of my invention is to provide an interlock device which can be rapidly and easily adjusted to maintain the cooperating parts thereof in register irrespective of the magnitude of wear on the valve.

These and other objects of my invention will be apparent from the following description when taken in connection with the drawings in which:

Figure 1 is a perspective view of my novel valve interlock device. This figure shows the interlock apparatus adapted and connected to a valve unit. In this figure the valve is in the closed position and the lock bolt has been moved through the registered openings of the geared locking disc and locking disc by means of the key lock bolt and associated cam. In this position and only in this position the key can be removed from the cylinder as illustrated. The dotted position indicates the position of the handle when the valve is in the open position.

Figures 2 through 6 are detailed views of the various components shown in the perspective view of Figure 1.

More specifically, Figure 2 is a top view of the locking disc showing a half moon cut-out which receives the lock bolt when the valve is locked in the closed position. This figure also illustrates the key way through the extension of the disc to enable it to be locked to the stem of the valve to permit re-positioning of the locking disc to compensate for wear and tear on the valve.

Figure 2a is a view taken along the line 2a—2a of Figure 2 showing the extension of the locking disc and the locking screws extending therethrough.

Figure 3 is a top view of the geared locking disc. This view shows the opening in the geared locking disc which registers with the opening of the locking disc to receive the lock bolt when the valve is locked in the closed position.

Figure 3a is a view taken in the direction of the arrows 3a—3a of Figure 3, illustrating the stepped cut-out section thereof to receive a hold-down screw.

Figure 4 is a top view of the adapter plate illustrating the opening therein which serves as a guide and support for the lock bolt.

Figure 4a is a view taken in the direction of the arrows 4a—4a of Figure 4.

Figure 5 is a top view of the single tooth gear which cooperates with the geared locking disc seen in Figures 3 and 3a.

Figure 5a is a view taken in the direction of the arrows 5a—5a of Figure 5 showing a side view of the single tooth gear forming one part of the Geneva type gear arrangement used in my novel interlock.

Figure 5b is a bottom view of the view of the single tooth gear as shown in Figure 5a.

Figure 6 is a top view of the bushing which is positioned concentric with the valve stem.

Figure 6a is a view showing the portion of the bushing which permits same to fit over the extension of the lock disc of Figures 2 and 2a.

Figure 7 is a cut-away cross-sectional view of my novel interlock device shown in Figure 1.

Figure 7a is a view taken in the direction of the arrows 7a—7a of Figure 7. This figure shows the half moon opening of the locking disc in register with the opening of the geared locking disc and having the lock bolt positioned therein.

Figure 7b is a view taken in the direction of the arrows 7a—7a of Figure 7 showing the position of the locking disc and geared locking disc when the valve is in the intermediate or fully open position.

Figure 7c is a view taken along the line 7c—7c of Figure 7 illustrating the connection of the handle, single tooth gear and locking disc to the stem of the valve.

Figure 8a is a view taken in the direction of the arrows 8a—8a of Figure 7 showing the position of the lock cam and lock bolt when the valve is in the interlocked position. In this position the lock bolt is positioned only through the opening in the supporting plate but does not extend to the opening of the geared locking discs.

Figure 1:
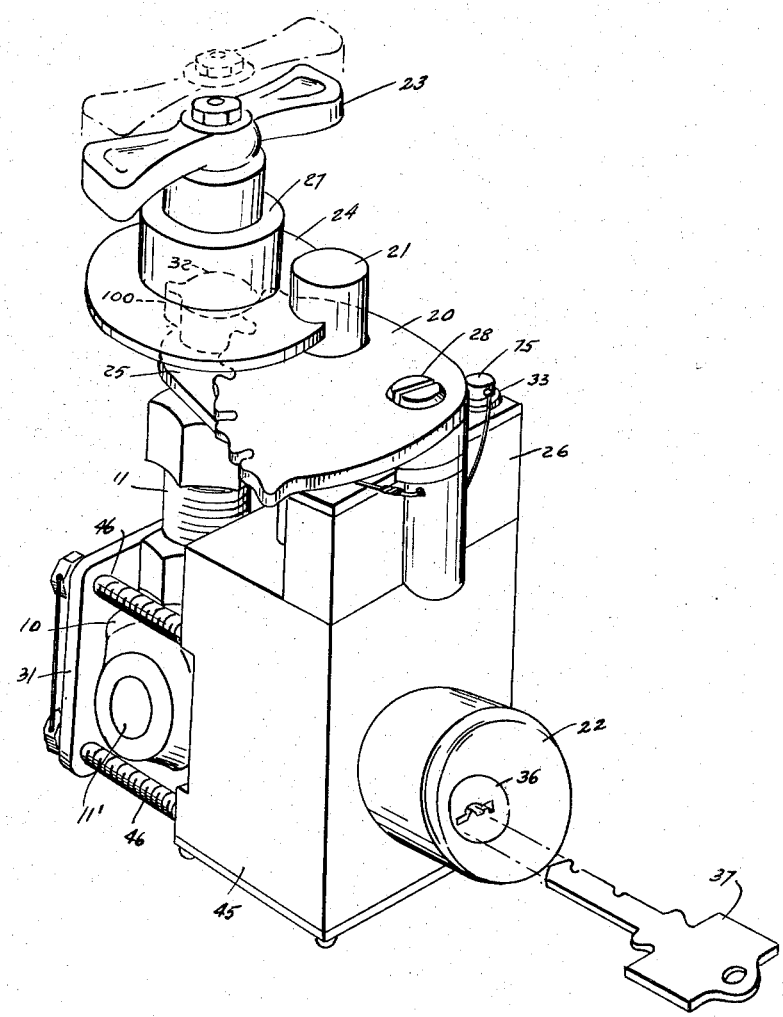

Figure 8b is a view taken in the direction of the arrows 8a—8a of Figure 7 and is similar to Figure 8a but shows the position of the lock cam and lock bolt when the valve is locked in the closed position. In this position the lock bolt is positioned through the opening in the supporting plate, the opening in the geared locking disc, and the opening in the locking disc, which are in register with each other.

Figure 9a is a view taken in the direction of the arrows 9a—9a of Figure 7 showing the position of the plug and lock bolt when the valve is in the open position. The dotted portion of this figure illustrates the position of these openings when the valve is in the locked position.

Figure 9b is a view taken in the direction of the arrows 9b—9b of Figure 9a showing the plug housing and associated lock bolt.

Figure 9c is a view taken in the direction of the arrows 9c—9c of Figure 9a and shows the relative position of the cam pin with respect to the lock bolt.

For the purpose of illustration I have shown my novel interlock device applied to a rising stem valve and adapted to lock the valve in the closed position. However, it will be apparent that this arrangement is given only for the purposes of illustration since my novel arrangement may be rapidly and easily adapted to lock any multi-revolution device in any predetermined position or positions.

Referring now to Figure 1 the valve 10 is provided with an input port 11' and an output port (not shown) for the flow of the fluid to be controlled. The valve 10 is provided with an upwardly extending portion 11 which houses the control stem therefor. It will be noted that the valve 10 may be of any standard make or design and forms no part of my present invention. However, the valve 10 is merely illustrated to show the manner in which my novel interlock device can be connected thereto to insure that it can be locked in a predetermined position such as a closed position.

The main components of my novel interlock device are the locking disc 24, the single tooth gear 32, the geared locking disc 20, the lock bolt 21 and the key 37 with its plug 36 which controls the positioning of the lock bolt 21.

Thus, generally the operation of my novel interlock device is as follows: Multiple clockwise rotation of the handle 23, which moves the valve from the open or intermediate position toward the closed position, will result in engagement between the single tooth gear 32 and the geared locking disc 20 once during each 360° rotation thereof.

While the valve 10 is in the open or intermediate position the opening 41 of the geared locking disc 20 will be out of alignment with the lock bolt 21, as seen in Figure 7b. Hence, even though an operator may attempt to rotate the key 37 and thereby raise the lock bolt in a vertical direction, this operation will be defeated due to the misalignment of the opening 41 with the lock bolt 21. However, continued clockwise rotation of the handle 23 will cause continued counterclockwise rotation of the geared locking disc 20 due to the Geneva type gear mesh between the single tooth gear 32 and the teeth 90 of the geared locking disc 20. Thus, after the handle 21 has moved the valve to the closed position the opening 41 of the geared locking disc 20 will be in axial alignment with the lock bolt 21, as seen in Figure 7a.

In this position the operator will be able to rotate the key 37, thereby raising the lock bolt 21 through the opening 41 and the associated registered opening 40 in the locking disc.

The key 37 can then be removed from the plug 36 and the lock bolt 21 will serve to defeat any rotation of the handle 23. That is, the positioning of the lock bolt 21 in the upward position, as seen in Figures 1, 7a and 8b, will insure that the valve 10 remains in the closed position until the key 37 is re-inserted in the plug 36 and rotated to remove the lock bolt 21 from positioning within the openings 40 and 41 of the locking disc 24 and the geared locking disc 20.

The main housing 45 is secured to the mounting plate 31 by means of a plurality of screws 46 to thereby form the main connection between the valve interlock device and the valve 10. The housing 45 serves as a support for the plug cylinder 22 and as a support and guide for the lock bolt 21 and its associated control cam 35.

It will be noted that the plug cylinder 22 may be permanently secured within the housing 45 by means of lock screw 60 or any other desirable means.

The plug cylinder 22 is provided with a plug 36 which retains the key 37 at all times other than in the closed position. That is, while the lock bolt 21 is in its lowermost position as seen in Figures 7, 8a and 9a, the key 37 cannot be removed from the plug 36. However, when the key 37 is moved substantially 180°, that is, when the openings 40 and 41, locking disc 24 and geared locking disc 20 are in alignment due to the valve being in closed position, the lock bolt 21 will be moved upwardly through these openings and the key 37 can then be removed from the plug 36.

A detailed view of the cam and pin arrangement which acts as the intermediate means to transmit rotational motion of the plug 36 into vertical motion of the lock bolt 21 is illustrated in Figures 8a and 8b. The lock bolt 21 is supported and guided in the opening 50 of the housing 45.

As best seen in Figures 8a and 8b, the pin 52, which is integrally secured to the cam 35, is positioned within the transverse slot 101 of the lock bolt 21. The cam 35 and its associated pin 52 are secured to the plug 36 for rotation therewith. When the key 37 is rotated substantially 180° from the open position of Figure 7 to the closed position of Figure 1 the cam 35 and its associated pin 52 are likewise rotated 180° from their lowermost position to their uppermost position, as seen by the comparison of Figures 8a and 8b.

The position of the plug 36 which corresponds to the position illustrated in Figure 8 is represented by "A" in Figure 9a and the position of the key bolt 21 when the components are in the position illustrated in Figure 8b is illustrated by the dotted position indicated by "B" of Figure 9a.

Thus, when the cam 35 and its associated pin 52 are so rotated they will be instrumental in urging the lock bolt 21 from its lowermost position of Figure 8a to its uppermost position of Figure 8b.

The lock bolt 21 may be secured within the housing 45 and attached to the cam pin 52 so that the lock bolt 21 will be prevented from having movement other than that transmitted thereto by means of the cam pin 52.

The spacer 26 is positioned on the top surface of the housing 45 adjacent the lock bolt 21. The supporting plate 25, as seen in Figures 1, 4, 4a, 7, 7a, and 7b, is positioned with openings 70, 71, 72 and 73. The opening 70 of the supporting plate 25 serves to receive the stem 60 of the valve 10. The opening 73 serves to receive the screws 75 which pass through the supporting plate and appropriate openings in spacer 26 to thereby be firmly secured in threaded openings of the housing 45. The screw 75 may be provided with washer means 32 and safety wired to the spacer 25 by means of copper wires 80.

The opening 71 of the supporting plate 25 is positioned in alignment with the lock bolt 21 housed in housing 45. Since the supporting plate 25 is positioned at one end by the passage of stem 60 to the opening 70 and securely fastened at its opposite end by the passage of screw 75—75 through the opening 73—73, the opening 71 will be in register and alignment with the lock bolt 21 at all times. That is, as seen in Figure 8, even when the lock bolt 21 is moved to its lowermost position by rotation of the key 37 from the dotted position of B to the solid position of A (as seen in Figure 9a) the lock bolt 21 will be positioned within the opening 71 of the supporting plate 25. Thus, two guide means are provided for the lock bolt 21, namely, channel 50 and housing 45 and opening 71 in the supporting plate 25, to thereby insure that the lock bolt 21 can be moved through the appropriate openings 40 and 41 of discs 24 and 20 when the valve is in the closed position and the operator rotates the key 37 180° from position A to position B, as seen in Figure 9a.

A geared locking disc 20, shown in Figures 3 and 3a is pivotally mounted on top of the adapter plate 25 as seen in Figures 1, 7, 7a and 7b. The geared locking disc is provided with an extension spacer 91 having a stepped portion 92 extending therethrough. A stepped screw 28 is passed through the opening 94 of the geared locking disc 20 and seats on the stepped portion 92 thereof. The threaded portion of the stepped screw 28 extends past the spacer extension 91 through the opening 72 of the supporting plate 25 and is threadably secured in an appropriate opening in the spacer 26. Hence, the screw means 28 represents a pivot for the geared locking washer 20, with relative motion therebetween.

If the valve 10 has been moved to closed position by means of the handle 23 when the geared locking disc 20 is mounted on the supporting plate 25 by means of the screw 32 it is positioned so that its opening 41 is in alignment with the lock bolt 21, as seen in Figure 7a. However, if the valve 10 is in the open position when the geared locking disc 20 is mounted on the supporting plate 25, then it will be positioned by means of the screw 28 in the position indicated in Figure 7b.

As heretofore noted the geared locking disc 20 is provided with a plurality of teeth 90 which mesh with the single tooth 100 of the gear 32. Since the locking disc 24 is rotated only once during each 360° rotation of the handle 23 and its associated gear 32 the number of teeth 90 will be determined by the number of revolutions of the handle 23 which are required to move the valve 10 from the fully open to the fully closed position. Thus, in the illustrations, it is assumed that the valve 10 requires between four and five revolutions of the handle 23 to move it from the fully closed to the fully open position and hence five gear teeth 90 are required on the geared locking disc 20.

The attachment of the handle 23, locking disc 24 and single tooth gear 32 to the stem 60 of the valve 10 will now be described. As best seen in the detailed view of Figure 7c which is taken in the direction of the arrows 7c—7c of Figure 7, the valve stem 60 is provided with a threaded extension 102, a stem extension which is threadably secured thereto and has a stepped squared cross-section extension 103 at the upper end thereof. A secured cut-away portion of the handle 23 is positioned on the extension 103 to thereby prevent relative rotation therebetween. The handle 23 is secured to the stem extension 30 by means of nut 104 which is in threaded engagement with the screw 105, which is an integral extension of member 103. Prior to the time that the handle is attached to the stem 103 the single tooth gear 32 is secured to the stem 60 and stem extension 30. The gear 32 is provided with an opening so that it may be positioned concentric with the stem 60 and extension 30. The locking screw 110 is provided to pass through the radius of the gear 32 to permit same to be locked to the stem extension 30 to thereby prevent relative rotation therebetween. The locking disc 24 with its extension 111 is provided with an opening 112 so that it might be mounted concentric with the stem 60 and the gear 32.

A set screw 34 is provided in the extension 111 of the locking disc 24 so that this latter unit may be rigidly secured to the gear 32 to thereby prevent relative motion therebetween. A stepped bushing 27, as seen in Figures 6 and 7a, is provided with an opening 120 so that it may be positioned over the extension 111 of the locking disc 24 and a portion of the gear 32. Although the bushing 27 is rotatably mounted on a locking disc 24 and gear 32, it is prevented from vertical movement when the handle 23 is secured in position by the nut 104. The bushing 27 thereby covers up the set screws 110 and 34 of the gear 32 and locking disc 24, respectively, to thereby prevent tampering therewith.

Thus, it will be seen that rotation of the handle 23 will not only cause rotation of the valve stem 60 but will also cause rotation of the single tooth gear 32 and the locking disc 24.

When the valve 10 is in the fully open position the relative position of the gear 32, locking disc 24 and geared locking disc 20 will be as seen in Figure 7b. In this position the locking bolt 21 will be stopped by the flat surface of the geared locking disc 20 when the operator attempts to lock the valve closed.

Thus, there is provided a positive means to prevent accidental locking of the valve in any position other than the closed position.

As the handle 23 is rotated in a clockwise direction the tooth 100 of the gear 32 will engage the teeth 90 of the geared locking disc once during each 360° rotation thereof and thereby move this latter unit counterclockwise. That is, the opening 41 of the geared locking disc 20 will be continuously moved closer to alignment with the lock bolt 21.

It should be noted that even though the opening 40 of the locking disc 21 will be in alignment with the lock bolt 21 at some period during each 360° rotation of the handle the geared locking disc 20 will still prevent the upward movement thereof. However, after the handle 23 has been rotated a sufficient number of revolutions in a clockwise direction to bring the valve 10 into the closed position the opening 40 of the locking disc 24 and the opening 41 of the geared locking disc 20 will be brought into alignment due to the Geneva mesh between the tooth 100 of the gear 32 and the teeth 90 of the gear locking disc 20, as seen in Figure 7a.

In this position the operator can rotate the key 37 180° from the solid position A to the dotted position B, as seen in Figure 9a, to thereby raise the bolt 21 upwardly as seen in Figures 1, 7a and the dotted position of Figure 9a.

In this position the operator will be able to remove the key 37 from its plug 36. Since the positioning of the lock bolt 21 through the openings 40 and 41 will prevent rotation of the discs 24 and 20, it will be impossible for any person to move the valve to the open position due to this positive locking engagement.

It will be noted that after extensive use of the valve 10 it is possible that the seating thereof may be altered so that a larger number of revolutions is required of the handle 23 in order to move the valve from the fully open to the fully closed position.

With my novel interlock device it is possible to readily and easily re-arrange the components in order to compensate for any wear which might take place within the valve. For example, the locking disc 24 and geared locking disc 20 must always be in a position as shown in Figure 7a when the valve 10 is in a closed position. Hence, by providing the set screw 34 for the locking disc 24 this latter unit can always be re-positioned so that its opening 40 is in alignment with the lock bolt 21 whenever the valve is in the completely closed position.

It will be noted that I have described a preferred embodiment of my invention in connection with a multiple revolution type valve. However, even though this is the broadest application of my invention it will be noted that my novel interlock device can also be applied to a single revolution stem valve. For this type of application the geared locking disc 20 can be completely removed from the unit by unscrewing the unit 28. Hence, since the opening 40 of the lock washer 24 is in register and alignment with the lock bolt 21 at only one period out of the 360° rotation of the handle 23 the remaining portion of the lock washer 24 will serve as an obstacle to the upward movement of the lock bolt 21 when the valve is not in a closed position.

It will be further noted that the interlocking device for a single revolution stem valve may also be operated with benefit of the geared locking disc 20 by re-positioning this latter unit so that its opening 41 is in alignment with the lock bolt 21 after a single revolution of the handle 23.

Furthermore, the geared locking disc 20 can either be re-positioned during initial assembly or the opening 41 can be re-positioned within the disc 20 so that the predetermined locked position can be either open or closed, intermediate or opened and closed.

In summary, I have provided a novel interlock device which is readily and easily adaptable for a multi-revolution valve and may be applied to either the rising or non-rising type of unit.

In the foregoing, I have described my invention only in connection with preferred embodiments thereof. Many variations and modifications of the principles of my invention within the scope of the description herein are obvious. Accordingly, I prefer to be bound not by the specific disclosure herein but only by the appended claims.

I claim:

1. In an interlock device for locking a valve in a first position, comprising a pair of cooperating gears, a plug, cam means and a lock bolt; said cam means controlled and positioned by rotation of said plug, said lock bolt controlled and positioned by said cam means, one of said cooperating gears having an opening therein, said opening in said cooperating gear being in alignment with said lock bolt when said valve is in said first position, said plug instrumental in moving said lock bolt by means of said cam means through said opening only when said valve is in said first position.

2. In a valve interlock device for the control of a multi-revolution rising stem valve comprising a locking disc, a geared locking disc, a gear, and a lock bolt; said gear and said locking disc being rigidly mounted concentric with the stem of said valve, said stem effective to cause rotation of said geared locking disc by force transmitted thereto by means of said gear, said locking disc and said geared locking disc each having an opening, said openings moved into axial alignment with said lock bolt by said stem and gear when said valve is moved to the closed position, said lock bolt being constructed to be movable into said axially aligned openings to effect locking of said valve.

3. In an interlock device for locking a valve in a first position, a pair of cooperating gears, means associated with said cooperating gears to prevent locking of said valve when said valve is in a position other than said first position, said cooperating gears positioned by the rotation of the stem of said valve, said means having an opening to permit locking by said interlock device when said valve is in said first position.

4. In an interlock device for locking a valve having an operating handle in a first position comprising a pair of discs, a plug, a lock bolt, and cam means; said operating handle being operatively connected to one of said discs; said cam means controlled and positioned by said plug, said lock bolt controlled and positioned by said cam means, each of said discs having openings therein, said openings in said discs being in alignment with said lock bolt when said valve is in said first position, said plug instrumental in moving said lock bolt by means of said cam means through said openings when said valve is in said first position, said discs defeating movement of said lock bolt by said plug when said valve is not in said first position.

5. In an interlock device for locking a valve in a first position, a pair of cooperating discs and a locking means, said cooperating discs preventing locking of said valve when said valve is in a position other than said first position, said cooperating discs positioned by the rotation of the stem of said valve, said cooperating discs positioned in accordance with the position of said valve, and said discs permitting locking by said locking means when said valve is in said first position.

6. In a valve interlock device for the control of a multi-revolution rising stem valve comprising a plug, a lock bolt, a geared locking disc, a locking disc and a single tooth gear; said locking disc and said single tooth gear being mounted concentric with the stem of said valve and rigidly secured thereto, said plug operatively connected to said lock bolt to effect movement thereof, said locking disc and geared locking disc each having an opening, said opening of said locking disc in alignment with said lock bolt at one period during each 360° rotation of said system, said opening of said geared locking disc in alignment with said lock bolt when said stem is in a first position, said opening of said locking disc and said geared locking disc in alignment with said lock bolt when said valve is in said first position to receive said lock bolt when said plug transmits motion thereto.

7. In a valve interlock device for the control of a multi-revolution stem valve comprising a housing for said valve, a plug, a lock bolt, a geared locking disc, a locking disc and a single tooth gear; said locking disc and said single tooth gear being mounted concentric with the stem of said valve and rigidly mounted in said housing, said lock bolt mounted in and guided by said housing, said plug operatively connected to said lock bolt to effect movement thereof, said locking disc having an opening, said opening of said locking disc in alignment with said lock bolt at one period during each 360° rotation of said device, said geared locking disc having an opening, said opening of said geared locking disc in alignment with said lock bolt when said stem is in a first position, said opening of said locking disc and said geared locking disc in alignment with said lock bolt when said valve is in said first position to receive said lock bolt when said plug transmits motion thereto.

8. An interlock device for control of a single-revolution valve comprising an operating handle, a locking disc, said locking disc being constructed to be adjustably maintained on said operating handle, said locking disc having an opening which is in alignment with a lock bolt at one period during the rotation of the operating handle, the period of alignment being adjustable responsive to the adjustable positions of said locking disc with respect to said operating handle.

9. An interlock device for locking a device in a first position comprising a first component, a plug, a lock bolt, and cam means; said device being controlled by a multi-revolution rising stem; said rising stem being controlled by an operating handle, said device controlled by said operating handle through said rising stem; said first component mounted on said stem and having an opening therein; said opening in said first component being in alignment with said lock bolt when said device is in said first position; said plug connected to cause movement of said lock bolt by means of said cam means into said opening; said first component permitting movement of said lock bolt into said opening by said cam and plug only when said device is in said first position to thereby lock said device in said first position.

References Cited in the file of this patent
UNITED STATES PATENTS

| | | |
|---|---|---|
| 1,115,792 | Drew | Nov. 3, 1914 |
| 1,205,861 | Cushing | Nov. 21, 1916 |
| 1,348,364 | Koebel | Aug. 3, 1920 |
| 2,184,652 | Sandberg | Dec. 26, 1939 |
| 2,442,763 | Falk | June 8, 1948 |